United States Patent
Varis Doggett et al.

(10) Patent No.: US 12,475,656 B2
(45) Date of Patent: Nov. 18, 2025

(54) SPACE AND CONTENT MATCHING FOR AUGMENTED AND MIXED REALITY

(71) Applicant: Disney Enterprises, Inc., Burbank, CA (US)

(72) Inventors: Erika Varis Doggett, Los Angeles, CA (US); Hayko Jochen Wilhelm Riemenschneider, Zürich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 17/749,005

(22) Filed: May 19, 2022

(65) Prior Publication Data

US 2023/0377279 A1    Nov. 23, 2023

(51) Int. Cl.
*G06T 19/00* (2011.01)

(52) U.S. Cl.
CPC .................. *G06T 19/006* (2013.01)

(58) Field of Classification Search
CPC ........... G06T 19/006; A63F 2300/8082; A63F 13/56; A63F 13/57; A63F 13/67
See application file for complete search history.

(56) References Cited

U.S. PATENT DOCUMENTS

| | | | |
|---|---|---|---|
| 7,796,155 B1 | 9/2010 | Neely, III et al. | |
| 8,884,984 B2 | 11/2014 | Flaks et al. | |
| 9,041,622 B2 | 5/2015 | McCulloch et al. | |
| 9,087,403 B2 | 7/2015 | Keating et al. | |
| 9,406,131 B2 | 8/2016 | Wurmlin et al. | |
| 9,514,573 B2 | 12/2016 | Grimaud | |

(Continued)

FOREIGN PATENT DOCUMENTS

| | | | | |
|---|---|---|---|---|
| CA | 3131389 A1 | * | 4/2022 | ............ G06F 1/163 |
| CN | 105493155 A | * | 4/2016 | ............ G06T 17/00 |

(Continued)

OTHER PUBLICATIONS

Brilakis et al., "Toward automated generation of parametric BIMs based on hybrid video and laser scanning data", Advanced Engineering Informatics, vol. 24, Issue 4, 2010, pp. 456-465 <https://www.sciencedirect.com/science/article/pii/S1474034610000509>.

(Continued)

*Primary Examiner* — Chante E Harrison
(74) *Attorney, Agent, or Firm* — Squire Patton Boggs LLP; Sarah Mirza

(57) ABSTRACT

Techniques for automatically placing and manipulating virtual objects of augmented reality (AR) and mixed reality (MR) simulations are described. One technique includes obtaining an indication of at least one virtual object available for placing within a real-world environment during an AR simulation or a MR simulation. A first representation of the real-world environment is generated, based on a scan of the real-world environment. At least one second representation of the real-world environment is generated from the first representation. A match is determined between the at least one virtual object and at least one available space within the real-world environment, based at least in part on evaluating the at least one virtual object and the at least one second representation with a machine learning model(s). The at least one virtual object is rendered on a computing device, based on the match.

22 Claims, 5 Drawing Sheets

(56) References Cited

U.S. PATENT DOCUMENTS

| | | | |
|---|---|---|---|
| 9,779,512 B2 | 10/2017 | Tomlin et al. | |
| 9,805,510 B2 | 10/2017 | Siddiqui et al. | |
| 9,824,495 B2 | 11/2017 | Hagbi et al. | |
| 9,857,470 B2 | 1/2018 | Hilliges et al. | |
| 9,892,561 B2 | 2/2018 | Choukroun et al. | |
| 9,911,232 B2 | 3/2018 | Shapira et al. | |
| 11,126,845 B1* | 9/2021 | Chaturvedi | G06F 3/011 |
| 2002/0158873 A1 | 10/2002 | Williamson | |
| 2008/0071559 A1 | 3/2008 | Arrasvuori | |
| 2012/0007852 A1 | 1/2012 | Morate et al. | |
| 2012/0154557 A1 | 6/2012 | Perez et al. | |
| 2015/0123966 A1 | 5/2015 | Newman | |
| 2015/0356774 A1 | 12/2015 | Gal et al. | |
| 2016/0012643 A1 | 1/2016 | Kezele et al. | |
| 2016/0026253 A1 | 1/2016 | Bradski et al. | |
| 2020/0320794 A1* | 10/2020 | Huang | G06F 3/017 |
| 2020/0342608 A1* | 10/2020 | Lamichhane | G06T 7/50 |
| 2021/0084259 A1* | 3/2021 | Kies | G06F 1/1686 |
| 2021/0103449 A1* | 4/2021 | Terpstra | G06F 9/4451 |
| 2021/0272537 A1 | 9/2021 | Mak | |
| 2022/0179220 A1* | 6/2022 | Hoover | G06F 3/04815 |
| 2022/0305388 A1* | 9/2022 | Hanke | A63F 13/56 |
| 2023/0186563 A1* | 6/2023 | Coffman | G06T 7/0002 345/419 |

FOREIGN PATENT DOCUMENTS

| | | | | |
|---|---|---|---|---|
| CN | 111954862 A | * | 11/2020 | G06F 1/1643 |
| CN | 112308980 A | * | 2/2021 | G06F 3/011 |
| EP | 3336805 A1 | * | 6/2018 | G06T 19/006 |
| EP | 3629302 A1 | * | 4/2020 | G06T 17/05 |
| EP | 4279157 A1 | * | 11/2023 | A63F 13/56 |
| JP | 2021527247 A | * | 10/2021 | |
| JP | 2023171298 A | * | 12/2023 | |
| WO | 2015192117 A1 | | 12/2015 | |
| WO | 2016107635 A1 | | 7/2016 | |
| WO | 2016114930 A2 | | 7/2016 | |
| WO | WO-2022004422 A1 | * | 1/2022 | G02B 27/0172 |

OTHER PUBLICATIONS

R. Nóbrega et al., "Interactive 3D Content Insertion in Images for Multimedia Applications", manuscript, received Apr. 2014, 38 pages.

Attene, M. "A lightweight approach to repairing digitized polygon meshes", Vis Comput 26, 1393-1406 (2010) [Abstract only] retrieved Apr. 26, 2022, 9 pages <https://doi.org/10.1007/s00371-010-0416-3>.

Extended European Search Report for Application No. 23174192.7, dated Oct. 2, 2023, 8 pages.

First Office Action received for Japanese Application No. 2023-079217 dated Jul. 17, 2024, 3 pages.

Office Action received for Japanese Application No. 2023-079217 dated Jan. 7, 2025, 7 pages including English translation.

* cited by examiner

SPACE AND CONTENT MATCHING FOR AUGMENTED AND MIXED REALITY

BACKGROUND

Today, augmented reality (AR) technology and mixed reality (MR) technology are increasingly being used in a variety of different fields, including, for example, the medical field, social networking and engagement, communications, shopping, entertainment industry, travel, navigation, education, etc. AR involves superimposing computer generated imagery on a user's view of the real-world environment. An AR system can use a video device to display a series of images (or video feed) of the real-world environment to a user, where the images have various virtual objects inserted into appropriate places in the environment. For example, the AR system can identify a real-world object of a table, so that a virtual object of a cup may be displayed on the video device as appearing on the table (e.g., from the perspective of the video device). MR is generally an extension of AR that allows for interaction between real and virtual objects in an environment. For example, in an MR experience, a user may adapt and manipulate visual content (e.g. graphics for gaming or an interactive story) overlaying a view of the physical environment.

Currently, many AR/MR experiences rely on the user to place and manipulate the size of a virtual object on the user's display device in order for the virtual object to "fit" in the user's real-world environment. Relying on this user manipulation to set up an AR/MR experience can negatively impact the user's immersive experience within the physical environment.

SUMMARY

One embodiment described herein is a computer-implemented method. The computer-implemented method incudes obtaining an indication of at least one virtual object available for placing within a real-world environment as part of an augmented reality (AR) simulation or a mixed reality (MR) simulation. The computer-implemented method also includes generating a first representation of the real-world environment, based on a scan of the real-world environment with one or more sensors of a computing device. The computer-implemented method also includes generating at least one second representation of the real-world environment from the first representation of the real-world environment, wherein the at least one second representation indicates at least one available space within the real-world environment. The computer-implemented method further includes determining a match between the at least one virtual object and the at least one available space within the real-world environment, based at least in part on evaluating the at least one virtual object and the at least one second representation of the real-world environment with one or more machine learning models. The computer-implemented method further includes rendering the at least one virtual object at a position on a display of the computing device, based on the match, the position on the display being associated with the at least one available space within the real-world environment.

Another embodiment described herein is a computing device. The computing device includes a display, one or more sensors, one or more processors, and a memory storing instructions, which, when executed on the one or more processors perform an operation. The operation includes obtaining an indication of at least one virtual object available for placing within a real-world environment as part of an augmented reality (AR) simulation or a mixed reality (MR) simulation. The operation also includes generating a first representation of the real-world environment, based on a scan of the real-world environment with the one or more sensors. The operation also includes generating at least one second representation of the real-world environment from the first representation of the real-world environment, wherein the at least one second representation indicates at least one available space within the real-world environment. The operation also includes determining a match between the at least one virtual object and the at least one available space within the real-world environment, based at least in part on evaluating the at least one virtual object and the at least one second representation of the real-world environment with one or more machine learning models. The operation further includes rendering the at least one virtual object at a position on the display, based on the match, the position on the display being associated with the at least one available space within the real-world environment.

Another embodiment described herein includes a non-transitory computer-readable medium containing computer program code that, when executed by operation of one or more computer processors, performs an operation. The operation includes obtaining an indication of at least one virtual object available for placing within a real-world environment as part of an augmented reality (AR) simulation or a mixed reality (MR) simulation. The operation also includes generating a first representation of the real-world environment, based on a scan of the real-world environment with one or more sensors of a computing device. The operation also includes generating at least one second representation of the real-world environment from the first representation of the real-world environment, wherein the at least one second representation indicates at least one available space within the real-world environment. The operation also includes determining a match between the at least one virtual object and the at least one available space within the real-world environment, based at least in part on evaluating the at least one virtual object and the at least one second representation of the real-world environment with one or more machine learning models. The operation further includes rendering the at least one virtual object at a position on a display of the computing device, based on the match, the position on the display being associated with the at least one available space within the real-world environment.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
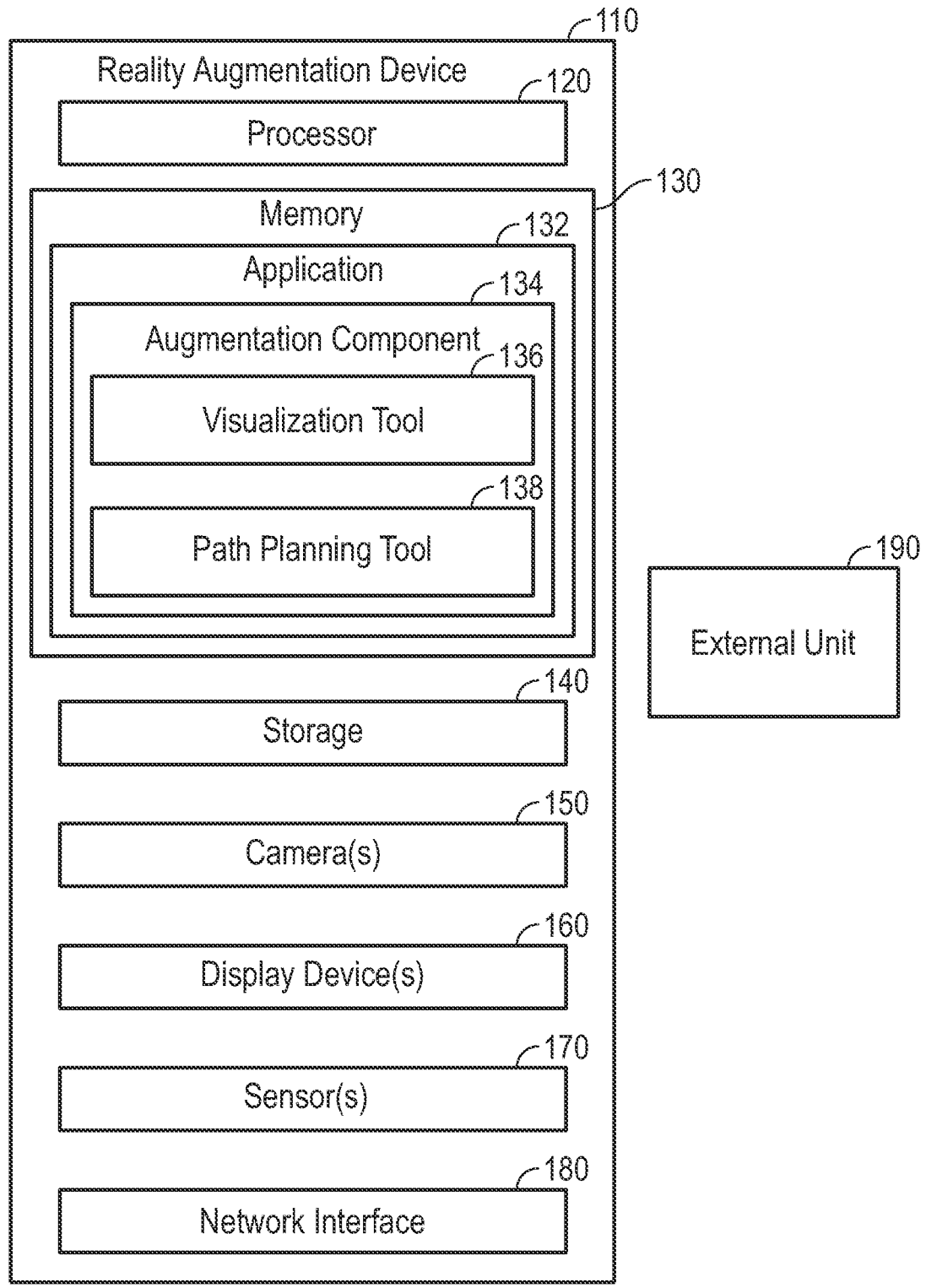
FIG. 1 is a block diagram illustrating an example reality augmentation device, according to one embodiment.

Many AR/MR experiences allow users to view and/or virtually interact with virtual objects in a real-world environment. The virtual objects may be or include digital representations of persons, fictional characters, locations, items, and identifiers such as brands and logos, for example, that populate a virtual reality (VR), AR, or MR environment. Moreover, the virtual objects may depict virtual worlds that can be experienced by any number of users synchronously and persistently, while providing continuity of data such as personal identity, user history, entitlements, possessions, payments, and the like. By way of example and not by way of limitation, AR/MR experiences may allow users to "preview" various virtual furniture items in a particular real-world environment (e.g., physical space, such as a living room, an office, a bedroom, etc.), allow users to view and interact with virtual characters in the user's real-world environment as part of an interactive story-telling experience, allow users to view and interact with graphics during interactive gaming, allow users to view and interact with other virtual users (e.g., avatars) in a virtual world, etc.

One challenge with conventional AR/MR experiences is that they generally rely on the user to place and size a virtual object(s) on the user's computing device so that the virtual object(s) can fit within the user's real-world environment. By way of example, assume a user initiates an interactive storytelling experience with a computing device. As part of the interactive storytelling experience, the computing device may render a virtual object (e.g., representative of a character or item within the interactive story, representative of virtual scenery, such as natural features and/or landscape within the interactive story, etc.) on the computing device to allow the user to visualize the virtual object (via the computing device) within the user's real-world environment.

However, the computing device may render the virtual object in a manner that lacks context of one or more attributes of the real-world environment (e.g., size of the real-world environment, size/arrangement/orientation of real items in the real-world environment, etc.). For example, assuming the real-world environment includes a "real-world," physical table, and assuming the virtual object is a virtual character, the computing device may render the virtual character on the computing device so that it appears that the virtual character is standing on top of the table as opposed to standing on the floor next to the table. Additionally, or alternatively, the computing device may render the virtual character with an incorrect size on the screen, so that it appears the virtual character is incorrectly sized with respect to the table (e.g., too small or too large with respect to the table from the perspective of the computing device).

Conventional AR/MR experiences generally address placement and sizing of virtual objects by relying on the user to perform an initial calibration step at the beginning of the AR/MR experience. During the initial calibration step, the user may be prompted to place a virtual character on a table and size it appropriately (e.g., by adjusting the size of the virtual character on the computing device's screen), so that subsequent virtual objects (e.g., of the same or different type as the initial virtual object) may be placed on the same table with the same size. After the initial calibration, subsequent virtual objects may be placed automatically, assuming the same environment information that was set up during the initial calibration. Relying on users to perform such an initial manual calibration step can lead to confusion, interrupt the immersive illusion, lead to the user accidently bumping into real-world objects when trying to manipulate the virtual objects, etc., all of which can lead to a negative user experience.

To address this, embodiments herein describe techniques for automatically adjusting attributes (e.g., size, placement, etc.) of a virtual object(s) that is rendered on a computing device such that the virtual object(s) matches the real-world environment. That is, embodiments can automatically determine how the user's real-world environment matches or doesn't match with a planned virtual object(s), so that the virtual object(s) can be automatically adjusted and customized to the given real-world environment, without manual user intervention.

In one embodiment described below, a computing device includes an augmentation component that is configured to generate a three-dimensional (3D) mesh of the available (e.g., empty) space within a real-world environment in which the user is located. The real-world environment may be an internal physical environment (e.g., an indoor space such as a room) or an external physical environment (e.g., an outdoor space such as a backyard, park, etc.). The augmentation component may also obtain virtual object(s) (e.g., from an AR/MR application executing on the computing device) that is planned for the real-world environment. For example, the virtual object(s) may be or include digital representations of persons, fictional characters, locations, items characters, items, etc., associated with the AR/MR experience that will be rendered on the computing device to allow the user to visualize the virtual object(s) within the real-world environment. The virtual object(s) may include stationary virtual object(s) and/or dynamic virtual object(s).

The augmentation component may evaluate (i) the 3D mesh of the available space within the real-world environment and (ii) the virtual object(s), using one or more machine learning techniques to determine a set of correspondences between the virtual object(s) and the available space within the real-world environment. For example, the augmentation component may determine to match the virtual object of a "talking teapot" from an interactive storytelling AR/MR experience to the planar surface of a real-world table that is visible on the user's computing device. The augmentation component may then automatically render the virtual object of the "talking teapot" on the computing device, such that the virtual object appears on the planar surface of the table from the perspective of the computing device.

Additionally, in some embodiments, the augmentation component can determine multiple correspondences between available space within the real-world environment and dynamic (e.g., changing) virtual object(s). For example, the augmentation component can determine a set of user paths within a real-world environment (e.g., a room), and determine, for each user path, a respective 3D mesh of the available space within the real-world environment.

For instance, a first path may be representative of a user walking a first direction (e.g., right) around a real-world object (e.g., table) within the real-world environment and a second path may be representative of a user walking a second direction (e.g., left) around the real-world object. In such an example, the augmentation component can generate a first 3D mesh of the available space within the real-world environment associated with the first path and a second 3D mesh of the available space within the real-world environment associated with the second path. The augmentation component can then determine, using machine learning techniques, for each user path, correspondences between the virtual object(s) and the available space within the real-world environment from the respective 3D mesh.

As the user transitions through the real-world environment, the augmentation component can determine the user's position within a given path (e.g., based on one or more sensors of the computing device) and automatically render virtual object(s) to the available spaces, based on the user's position, user attributes (e.g., user height, accessibility limitations), and correspondence information. As a reference example, the virtual object of a "superhero character" from an interactive gaming experience may be rendered as appearing on a first side of the user when the user is on the first path and may be rendered as appearing on a different, second side of the user when the user is on the second path.

In this manner, embodiments can automatically place and manipulate a virtual object(s) that is placed on a user's computing device as part of an AR/MR experience, without relying on the user to manually manipulate the virtual object(s). As a result, embodiments enable computing devices to create dynamic and personalized AR/MR experiences that automatically adapt to multiple users and real-world environments.

Note many of the following embodiments use interactive storytelling as a reference example of an AR/MR experience in which the techniques described herein for automatically placing and manipulating virtual object(s) can be used. Note, however, that the techniques described herein can be used in a variety of different types of AR/MR experiences, including, for example, shopping, travel, social interactions (e.g., the "multiverse"), navigation, gaming, etc.

FIG. 1 is a block diagram illustrating a reality augmentation device 110 configured with an augmentation component 134, according to one embodiment. The reality augmentation device 110 is generally representative of a variety of computing devices, including, for example, a smartphone, a tablet, a laptop computer, headset, visor, head mounted display (HMD), glasses, etc. The reality augmentation device 110 may be an AR-capable computing device, an MR-capable computing device, or an AR/MR capable computing device. The reality augmentation device 110 may implement one or more techniques described herein for automatically placing and manipulating virtual object(s) as part of an AR/MR experience.

The reality augmentation device 110 includes a processor 120, a memory 130, a storage 140, one or more cameras 150, one or more display devices 160, one or more sensors 170, and a network interface 180. The processor 120 represents any number of processing elements, which can include any number of processing cores. The memory 130 can include volatile memory, non-volatile memory, and combinations thereof. The memory 130 generally includes program code for performing various functions related to applications (e.g., application 132) hosted on the reality augmentation device 110.

The application 132 is representative of a component of a client server application (or other distributed application). Application 132 may be a "thin" client where the processing is largely directed by the application 132, but performed by computing systems of a server backend (not shown), or a conventional software application installed on the reality augmentation device 110. Here, the application 132 includes an augmentation component 134, which is described in more detail below.

The storage 140 may be a disk drive storage device. Although shown as a single unit, the storage 140 may be a combination of fixed and/or removable storage devices, such as fixed disc drives, removable memory cards, or optical storage, network attached storage (NAS), or a storage area-network (SAN). The network interface 180 may be any type of network communications interface that allows the reality augmentation device 110 to communicate with other computers and/or components (e.g., external unit 190) in a computing environment via a data communications network.

The display device(s) 160 and camera(s) 150 allow the user to view a real-world environment where the reality augmentation device 110 is located, from the perspective of the reality augmentation device 110. For example, the camera(s) 150 can capture a visual scene. As used herein, a visual scene refers to a view(s) of the real-world environment in which the reality augmentation device 110 is being used. For instance, a visual scene may be a series of images (e.g., a video feed) of a real-world environment. The visual scene can be shown on the display device(s) 160. For example, the camera(s) 150 may be activated to provide (to the display device(s) 160) a visual scene over which virtual objects may be overlaid. The display device(s) 160 may include a Liquid Crystal Display(s) (LCD(s)), Light Emitting Diode(s) (LED(s)), organic light-emitting diode display(s) (OLED(s)), quantum dot (QD) display(s), or any other suitable display technology that performs a physical transformation of signals to light. The camera(s) 150 may be provided in conjunction with image recognition software (e.g., stored in memory 130) to identify real-world objects in the field-of-view of the camera(s) 150.

The sensor(s) 170 are configured to sense information from the real-world environment. In one embodiment, the sensor(s) 170 include an accelerometer, a gyroscope, or a combination thereof. The accelerometer can measure acceleration forces acting on the reality augmentation device 110 and may provide information as to whether the reality augmentation device 110 is moving, and in which direction(s). The accelerometer can also be used to determine a tilt of the reality augmentation device 110. The gyroscope can measure an orientation of the reality augmentation device 110, and can provide information as to whether the reality augmentation device 110 is level or to what degree the reality augmentation device 110 is tilted in one or more planes. In one embodiment, the combination of the accelerometer and the gyroscope may provide information of a direction sense for the reality augmentation device 110 in terms of pitch and roll with respect to gravity.

In general, the reality augmentation device 110 may include any number of sensors and/or utilize any technique or combination of techniques, suitable with the functionality described herein, to determine an orientation (e.g., tilt) of the reality augmentation device 110. Similarly, the sensor(s) 170 can include various types of sensors and is not limited to an accelerometer and a gyroscope. Other types of sensors 170 include, but are not limited to, Light Detection and Ranging (LiDAR) sensors, a Global Positioning System (GPS) receiver, inertial motion units (IMUs), or any type of sensor that provides information regarding a position and/or location of the reality augmentation device 110 in a real-world environment.

The augmentation component 134 generally allows a user to visualize and virtually interact with virtual object(s) in a real-world environment. In embodiments described herein, the augmentation component 134 can automatically place and manipulate virtual objects that are overlaid onto a visual scene of the real-world environment. The augmentation component 134 includes a visualization tool 136 and a path planning tool 138, each of which can include software components, hardware components, or combinations thereof. The visualization tool 136 and the path planning tool 138 are described in more detail below.

In some embodiments, the reality augmentation device 110 may use and/or interact with the external unit 190 to provide an AR/XR experience for the user. In such embodiments, one or more components of the reality augmentation device 110 may be included within the external unit 190. For example, the external unit 190 may include an AR headset that provides a display device(s) 160, camera(s) 150, and/or sensor(s) 170. The AR headset may be a headset worn by the user, examples of which can include an HMD, eye-glasses, AR/MR glasses, AR/MR visor, helmet, etc. In embodiments where the AR headset is separate from the reality augmentation device 110, the AR headset may be communicatively coupled to the reality augmentation device 110 and may exchange information with the augmentation component 134 in order to implement the techniques described herein.

Figure 2:
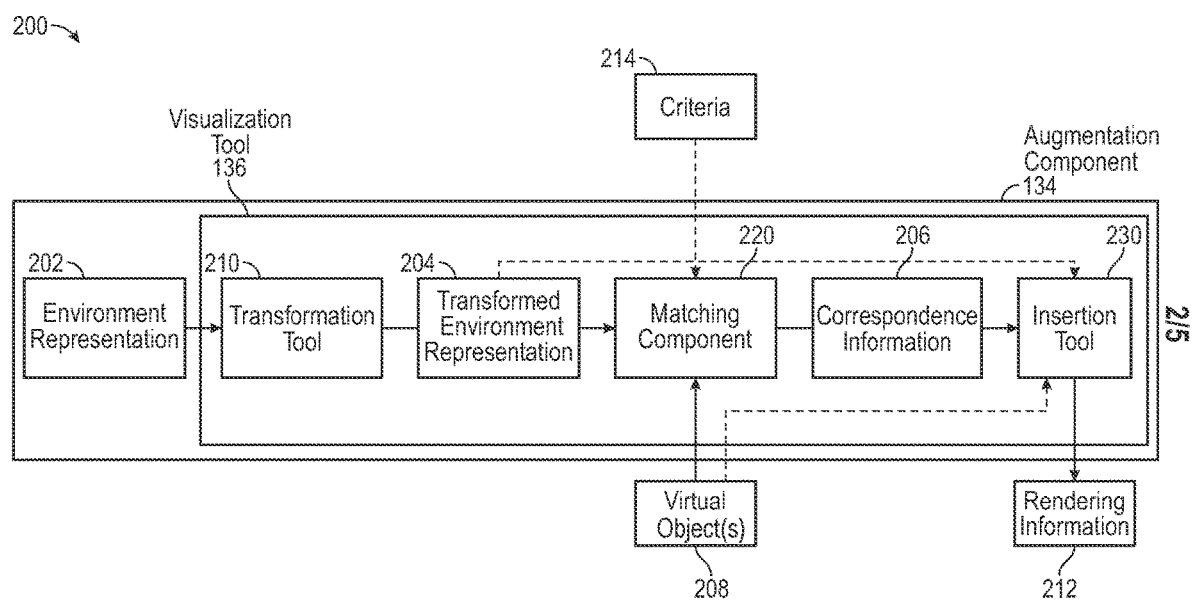
FIG. 2 is a block diagram illustrating an example workflow for automatically placing and manipulating a virtual object(s) as part of an AR/MR experience, according to one embodiment.

FIG. 2 is a block diagram illustrating an example workflow 200 for automatically placing and manipulating a virtual object(s) as part of an AR/MR experience, according to one embodiment. The workflow 200 may be implemented by an augmentation component 134 and/or one or more components of a reality augmentation device 110.

In one embodiment, the augmentation component 134 may generate an environment representation 202, which is generally a 3D point cloud or a 3D mesh of the real-world environment in which the reality augmentation device 110 is located. The augmentation component 134 may generate the environment representation 202 as part of an initial scan of the real-world environment with the camera(s) 150 and/or sensor(s) 170 (e.g., LiDAR sensors). The augmentation component 134 may prompt the user to scan the real-world environment. For example, for an indoor environment, the user may scan the floors, walls, real-world object(s), etc., within the indoor environment. For an outdoor environment, the user may scan the natural features (e.g., trees, bushes, etc.) within the outdoor environment. In one example, the augmentation component 134 can detect surfaces within the real-world environment using the camera(s) 150 during the scan. The camera(s) 150 can capture one or more images of the real-world environment and the augmentation component 134 can determine a 3D geometry of the real-world environment, based on the captured image(s). In another example, the augmentation component 134 can determine a 3D geometry of the real-world environment, based on a LiDAR scan of the real-world environment using one or more LiDAR sensors.

The augmentation component 134 can use a variety of computer vision techniques (e.g., scale-invariant feature transform (SIFT)) and/or software development kits (SDKs) (e.g., ARKit, ARCore, Wikitude, etc.) to detect plane geometry of various surfaces within the real-world environment based on camera(s) 150 and/or sensor(s) 170. Using one or more of these tools, the augmentation component 134 can process each image and extract a set of feature points (e.g., an edge of an object, corner of an object, center of an object, etc.) for each image (e.g., using SIFT). The augmentation component 134 can track the feature points across multiple images (or frames) as the reality augmentation device 110 moves during the scan.

The augmentation component 134 can fit planes to the feature points and find the best match in terms of scale, orientation, and position. The augmentation component 134 can continually update the detected planes (e.g., based on feature extraction and plane fitting), as the reality augmentation device 110 moves during the scan. In this manner, the augmentation component 134 can identify planes for various surfaces in the real-world environment and generate the environment representation 202.

In some cases, the environment representation 202 may include missing regions (e.g., holes, gaps, etc.), which may be caused by an improper or an incomplete scan of the real-world environment. For example, the user may not scan all regions of the real-world environment, such as the ceiling of an indoor environment or the sky of an outdoor environment. In such cases, the augmentation component 134 can use computer vision techniques (e.g., poisson reconstruction, open source libraries, such as MeshFix, etc.) and/or deep learning techniques (e.g., Point2Mesh, 3D model inpainting based on Generative Adversarial Networks (GANs), etc.) to detect and fill the missing regions, so that the environment representation 202 forms a watertight mesh. One example of an algorithm that can be used to detect and fill missing regions can be found in Attene, M., "A lightweight approach to repairing digitized polygon meshes," Vis Comput 26, 1393-1406 (2010).

In some cases, the augmentation component 134 can detect the missing regions (e.g., ceiling of an indoor environment, sky of an outdoor environment, etc.) by checking for the "y-up" dimension and verifying that a closed mesh exists in that dimension within some predefined threshold (e.g., a predefined percentage of gradience). If a closed mesh does not exist within the "y-up" dimension, the augmentation component 134 can use any of the above computer vision techniques and/or deep learning techniques to fill in the mesh within the "y-up" dimension, so that the environment representation 202 forms a watertight mesh.

As shown in FIG. 2, the augmentation component 134 includes the visualization tool 136, which is generally configured to generate a visualization of a virtual object(s) for an AR/MR experience. In one embodiment, the visualization tool 136 can determine how to automatically place and manipulate (e.g., adjust the size and/or orientation) of virtual object(s) 208, based on an evaluation of the virtual object(s) 208 and the environment representation 202. Here, the visualization tool 136 includes a transformation tool 210, a matching component 220, and an insertion tool 230, each of which can include software components, hardware components, or a combination thereof.

The transformation tool 210 receives the environment representation 202 and performs one or more computer vision techniques on the environment representation 202 to generate a transformed environment representation 204. In one embodiment, the transformed environment representation 204 is a 3D point cloud or 3D mesh of the available (e.g., empty) space within the real-world environment. For example, the transformation tool 210 can compute the inverse of the environment representation 202 in order to generate the 3D point cloud or 3D mesh of the available space within the real-world environment.

The matching component 220 receives the transformed environment representation 204 and the virtual object(s) 208. In one embodiment, the virtual object(s) 208 includes one or more stationary virtual objects. Each of the stationary virtual objects may be in the form of a 3D mesh. The matching component 220 can evaluate the transformed environment representation using machine learning techniques (e.g., a deep learning machine learning model) to match the 3D meshes of the stationary virtual object(s) to available spaces within the transformed environment representation 204.

In some embodiments, the matching component 220 (as part of matching) may automatically adjust the size and/or orientation of the virtual object(s) 208 so that the virtual object(s) 208 fits within the available space within the real-world environment. For example, assuming the virtual object(s) 208 includes a virtual object of a "globe," the matching component 220 may adjust the size of the "globe" to float in the largest available space of the real-world environment. The largest available space may depend on the type of real-world environment. In one example, assuming the real-world environment is a living room, the largest available space may be above a coffee table in the living room. In another example, the largest available space may be in an empty corner of the living room.

In some embodiments, the matching component 220 may take into account the context (e.g., semantic meaning) of the virtual object(s) 208 as well as the context of the available space within the real-world environment when determining how to match the virtual object(s) 208 to the available spaces within the transformed environment representation 204. For example, the matching component 220 may perform semantic segmentation to identify the "class" of each of the real-world items within the real-world environment and identify the "class" of the virtual object(s) 208.

For instance, assume the virtual object(s) 208 includes a virtual object of a "dog" and that the real-world environment includes first available space on the floor and second available space on a table within the real-world environment. In this particular example, the matching component 220 may identify, based on performing semantic segmentation, that the first available space has a class label of "floor," that the second available space has a class label of "table," and that the virtual object has a class label of "dog." Based on these class labels, the matching component 220 may match the virtual object of the "dog" to the first available space (with the class label of "floor") as opposed to the second available space (with the class label of "table").

In some embodiments, the matching component 220 may determine the semantic meaning of different available spaces automatically (e.g., based on performing semantic segmentation using a semantic deep learning neural network). In other embodiments, the matching component 220 may determine the semantic meaning of different available spaces based on user input in the form of criteria 214. For example, the criteria 214 may specify user preferences for the matching between different types of virtual object(s) and different types of available spaces. Continuing with the above example, the criteria 214 may specify that virtual object(s) of "dogs" should be matched to available spaces on the "floor" as opposed to on other types of available spaces, such as "tables" or "chairs."

Continuing with FIG. 2, the matching component 220 outputs the correspondence information 206, based on the evaluation of the transformed environment representation 204 and the virtual object(s) 208. The correspondence information 206 may include mappings between each of the virtual object(s) 208 and the available spaces within the transformed environment representation 204.

The insertion tool 230 receives the correspondence information 206 and generates rendering information 212 for rendering the virtual object(s) 208 onto the display device(s) 160 of the reality augmentation device 110, such that the virtual object(s) 208 appears in the matched available spaces (of the real-world environment) indicated within the correspondence information 206. In some embodiments, the insertion tool 230 may also determine the rendering information 212 based at least in part on the transformed environment representation 204 and/or the virtual object(s) 208. The rendering information 212, for example, may include a position in screen space (e.g., a two-dimensional (2D) location on the display device(s) 160) for each of the virtual object(s) 208.

Figure 3:
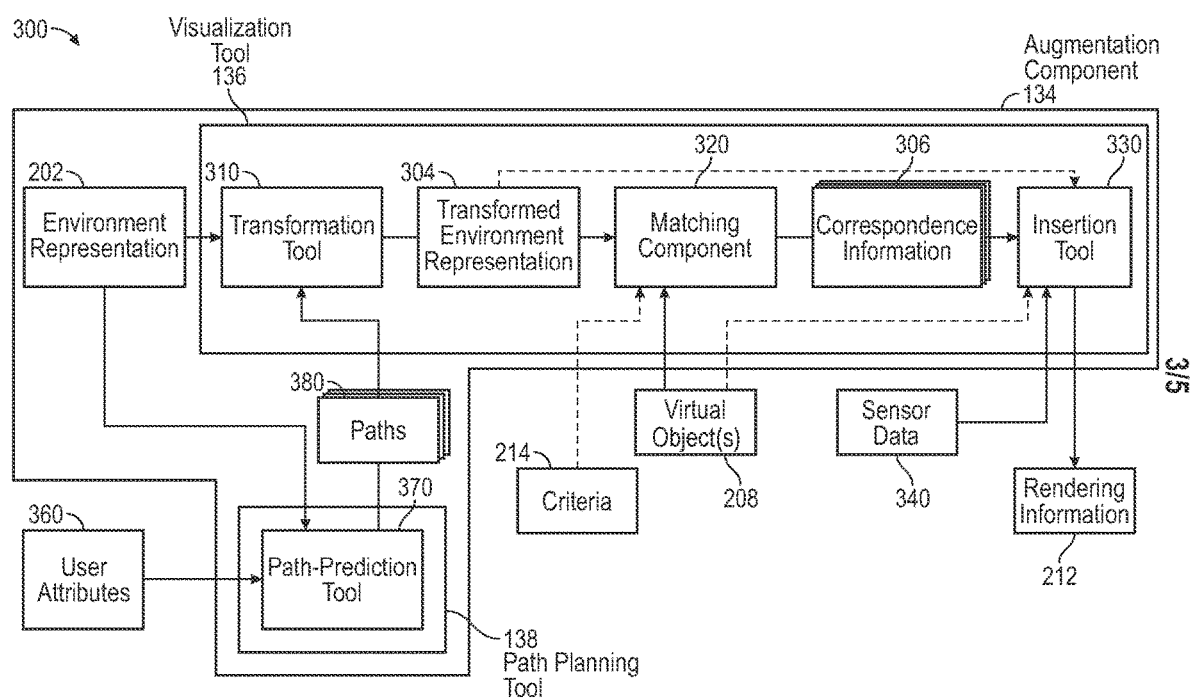
FIG. 3 is a block diagram illustrating another example workflow for automatically placing and manipulating a virtual object(s) as part of an AR/MR experience, according to one embodiment.

FIG. 3 is a block diagram illustrating an example workflow 300 for automatically placing and manipulating a virtual object(s) as part of an AR/MR experience, according to one embodiment. The workflow 300 may be implemented by an augmentation component 134 and/or one or more components of a reality augmentation device 110. In one embodiment, the workflow 300 may be used for automatically placing and manipulating dynamic virtual object(s) as part of the AR/MR experience.

As described above relative to FIG. 2, the augmentation component 134 may generate the environment representation 202 for a real-world environment in which the reality augmentation device 110 is located. The environment representation 202 may be input into a path planning tool 138, which includes a path-prediction tool 370. The path-prediction tool 370 is generally configured to determine a set of predefined paths 380 that a user may take through the real-world environment. Each path 380 may include a 3D volume of the amount of space taken by the user through the real-world environment. The path-prediction tool 370 may implement a variety of path planning algorithms, including, for example, heuristic search methods, intelligent algorithms (e.g., particle swarm, genetic algorithms, etc.), etc.

In some embodiments, the set of paths 380 may include different paths through the real-world environment for a single user having a set of user attributes 360. For example, assuming the user is an adult, the path-prediction tool 370 can generate the paths 380 based on a user height specified within the user attributes 360. That is, each path 380 may include a 3D volume based in part of the user height (e.g., a vertical distance from the floor). In other embodiments, the set of paths 380 may include different paths through the real-world environment for multiple users, each having a different set of user attributes 360. For example, a first set of paths 380 may include different paths for "adult" users having a particular height range (e.g., 3D volumes based on the particular height range). Similarly, a second set of paths 380 may include different paths for "child" users having another particular height range (e.g., 3D volumes based on the other particular height range).

The path-prediction tool 370 may determine the set of paths 380 and provide the set of paths 380 to the transformation tool 310 of the visualization tool 136. The transformation tool 310 may perform similar operations as the transformation tool 210 described relative to FIG. 2. For example, the transformation tool 310 may compute the inverse of the environment representation 202 and may generate multiple transformed environment representations 304 corresponding to the set of paths 380. Each transformed environment representation 304 may be a 3D point cloud or 3D mesh of the available space along a different path 380 through the real-world environment.

The matching component 320 may perform similar operations as the matching component 220. For example, the matching component 320 may receive the transformed environment representations 304 (corresponding to the paths 380) along with the virtual object(s) 208, and may evaluate the information using one or more machine learning techniques (e.g., (semantic) deep learning neural network model) to determine the multiple correspondence information 306. Each correspondence information 306 may include, for a given path 380, a match between the virtual object(s) 208 to available spaces within the transformed environment representation 304 corresponding to the path 380.

Similar to the matching component 220, in some embodiments, the matching component 320 may be configured to automatically take into account the context (e.g., semantic meaning) of the virtual object(s) 208 along with the context of the available spaces from the transformed environment representation 304 when performing the matching, where the context is determined based on performing semantic segmentation. On the other hand, in other embodiments, the matching component 320 may determine the context from the criteria 214.

The insertion tool 330 may perform similar operations as the insertion tool 230. For example, the insertion tool 330 may receive the multiple correspondence information 306 and generate rendering information 212 for rendering the virtual object(s) 208 onto the display device(s) 160 of the reality augmentation device 110. The virtual object(s) 208 may be rendered such that it appears in the matched available spaces of a given path indicated within a corresponding correspondence information 306. In some embodiments, the insertion tool 330 may also determine the rendering information 212 based at least in part on the transformed environment representations 304 and/or the virtual object(s) 208.

In some embodiments, the insertion tool 330 may output a different set of rendering information 212, based on the user's current position within the real-world environment. For example, the insertion tool 330 may receive sensor data 340 indicative of the user's current position. Based on the user's current position, the insertion tool 330 may determine, from the multiple correspondence information 306, whether to update the rendering of the virtual object(s) 208 and may include an updated set of rendering information 212. In this manner, the augmentation component 134 can automatically place and manipulate virtual object(s) based on the user's current position within a real-world environment as part of the AR/MR experience.

Figure 4:
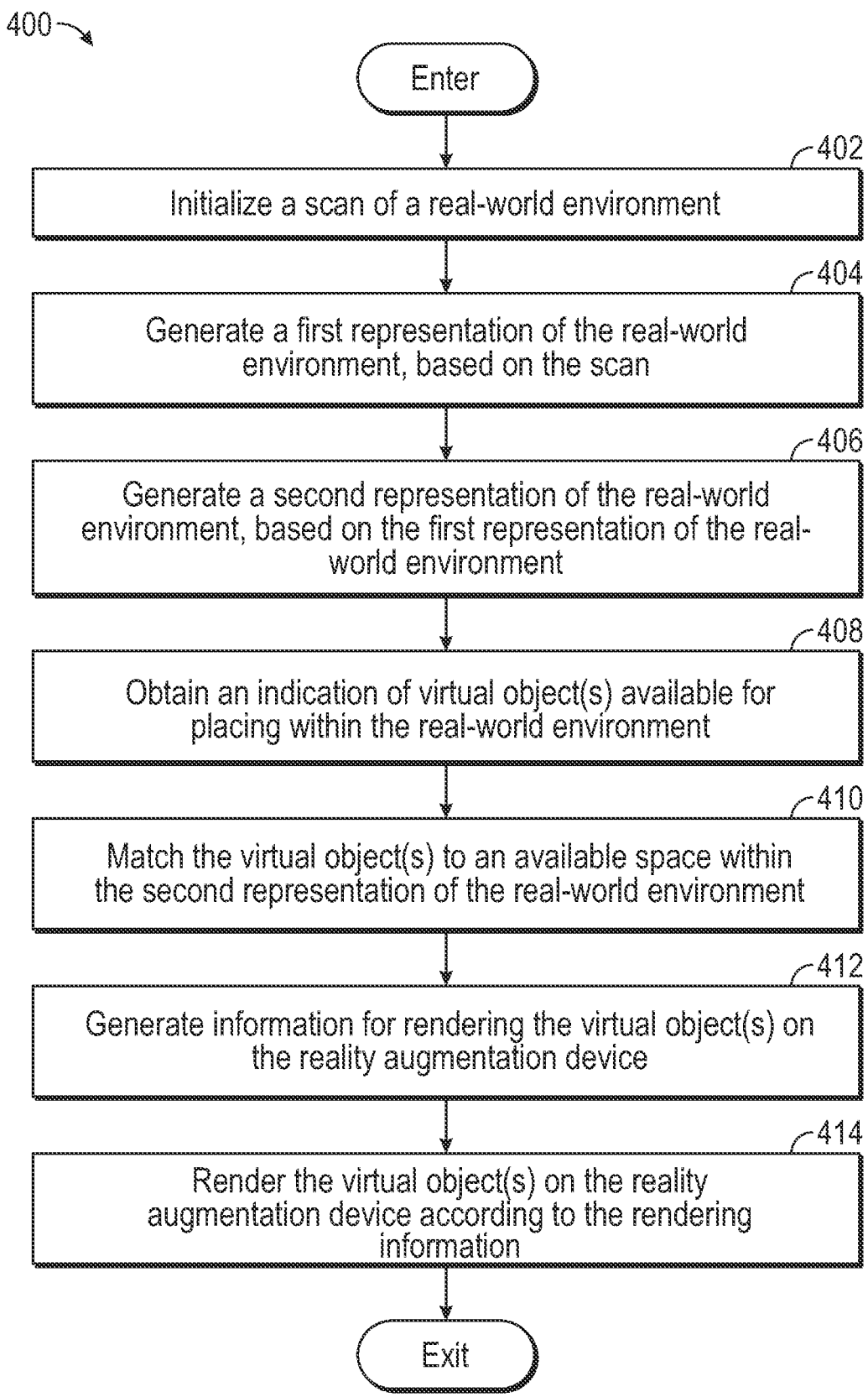
FIG. 4 is a flowchart of a method for automatically placing and manipulating a virtual object(s), according to one embodiment.

FIG. 4 is a flowchart of a method 400 for automatically placing and manipulating a virtual object(s), according to one embodiment. The method 400 may be performed by one or more components of a reality augmentation device (e.g., reality augmentation device 110). In one embodiment, the method 400 is performed by an augmentation component (e.g., augmentation component 134) of a reality augmentation device.

Method 400 begins at block 402, where the augmentation component initiates a scan of a real-world environment using one or more cameras (e.g., camera(s) 150) and/or one or more sensors (e.g., sensor(s) 170). At block 404, the augmentation component generates a first representation of the real-world environment (e.g., environment representation 202) based on the scan. The first representation of the real-world environment may include a 3D point cloud or a 3D mesh of the real-world environment (e.g., a 3D representation of the boundaries (such as floors, walls, etc.) as well as real-world objects (such as table, chairs, trees, etc.) in the real-world environment).

At block 406, the augmentation component generates a second representation of the real-world environment (e.g., transformed environment representation 204), based on the first representation of the real-world environment. The second representation of the real-world environment may include a 3D point cloud or a 3D mesh of the available (e.g. empty space) within the real-world environment (e.g., a 3D representation of the available space within the boundaries (such as the floor) as well as the available space above or below certain real-world objects (such as the surface of a table) in the real-world environment). In one embodiment, the second representation of the real-world environment may be generated by computing an inverse of the first representation of the real-world environment.

At block 408, the augmentation component obtains an indication of virtual object(s) (e.g., virtual object(s) 208) available for placing within the real-world environment (e.g., as part of an AR/MR experience). The virtual object(s) may include at least one stationary virtual object or dynamic virtual object, which may be in the form of a 3D mesh.

At block 410, the augmentation component matches the virtual object(s) to an available space(s) within the second representation of the real-world environment, based on an evaluation of the virtual object(s) and the second representation of the real-world environment with one or more machine learning techniques. In one embodiment, the matching performed in block 410 may include determining and/or adjusting a size and/or orientation of the virtual object(s) for the matched available space within the real-world environment. The augmentation component may generate a set of information that includes an indication of the matching (e.g., correspondence information 206). In one embodiment, the operations in block 410 may be performed by a matching component 220, described in greater detail above with respect to FIG. 2.

At block 412, the augmentation component generates information (e.g., rendering information 212) for rendering the virtual object(s) on a display device (e.g., display device(s) 160) of the reality augmentation device, based on the matching. For example, the rendering information may include at least one of (i) the position in screen space in which to render the virtual object(s), (ii) the orientation in which to render the virtual object(s) or (iii) the size of the virtual object(s) in which to render the virtual object(s), so that the virtual object(s) appears on the display device as being placed in the available space within the real-world environment with the appropriate size, position, and/or orientation according to the matching performed in block 410.

At block 414, the augmentation component renders the virtual object(s) on the display device of the reality augmentation device according to the rendering information. In embodiments where the display device is part of an external unit (e.g., external unit 190), the augmentation component (at block 414) can render the virtual object(s) on the display device of the external unit.

Figure 5:
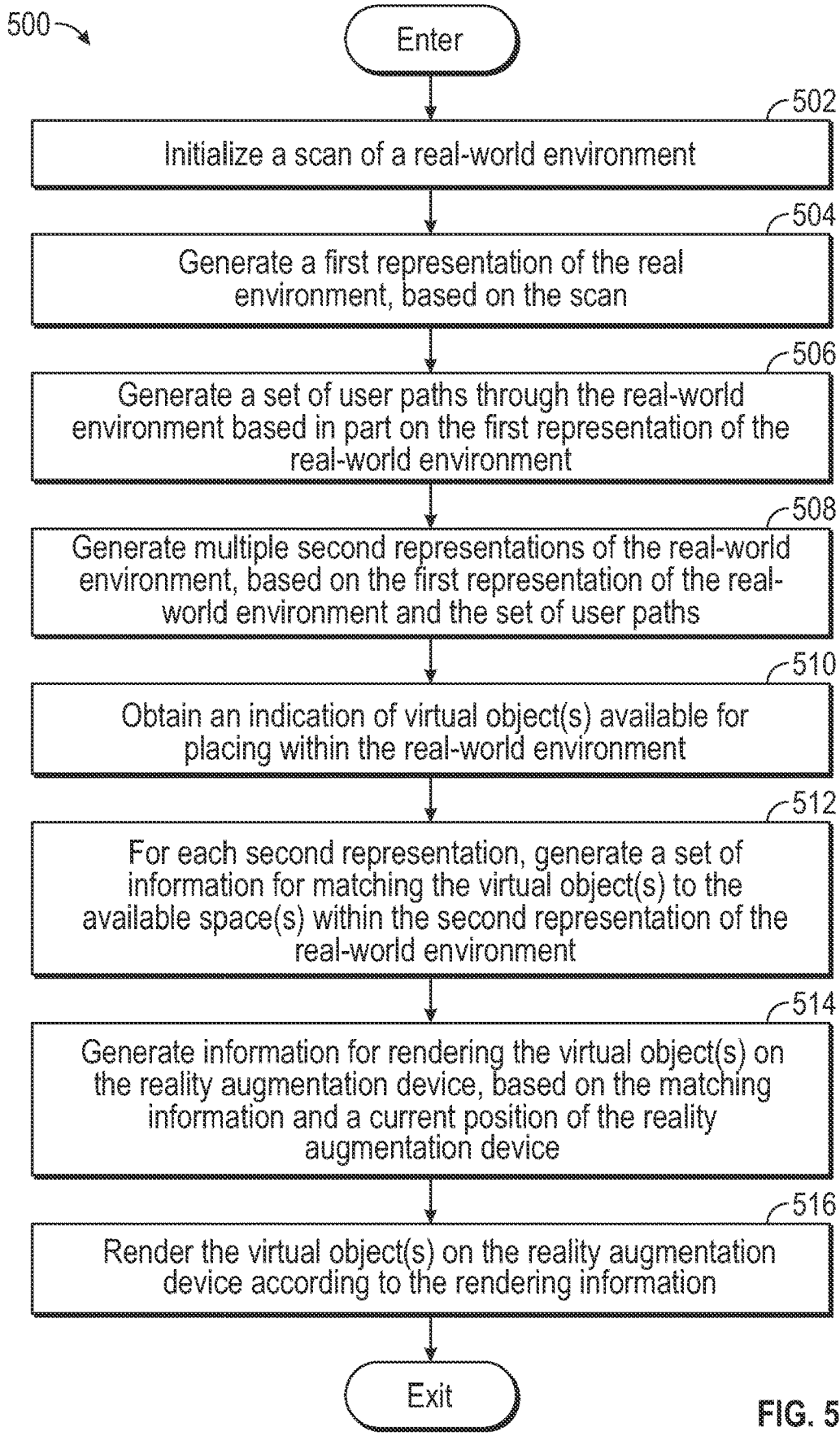
FIG. 5 is a flowchart of another method for automatically placing and manipulating a virtual object(s), according to one embodiment.

FIG. 5 is a flowchart of a method 500 for automatically placing and manipulating a virtual object(s), according to one embodiment. The method 500 may be performed by one or more components of a reality augmentation device (e.g., reality augmentation device 110). In one embodiment, the method 500 is performed by an augmentation component (e.g., augmentation component 134) of a reality augmentation device.

Method 500 enters at block 502, where the augmentation component initiates a scan of a real-world environment using one or more cameras (e.g., camera(s) 150) and/or one or more sensors (e.g., sensor(s) 170). At block 504, the augmentation component generates a first representation of the real-world environment (e.g., environment representation 202) based on the scan. The first representation of the real-world environment may include a 3D point cloud or a 3D mesh of the real-world environment (e.g., a 3D representation of the boundaries (such as floors, walls, etc.) as well as real-world objects (such as table, chairs, etc.) in the real-world environment).

At block 506, the augmentation component generates a set of user paths (e.g., paths 380) through the real-world environment based in part on the first representation of the real-world environment. In addition to the first representation, in some embodiments, the augmentation component can generate the set of user paths based on one or more user attributes (e.g., user attributes 360). In one embodiment, the operations in block 506 may be performed by a path planning tool 138, described in greater detail above with respect to FIG. 3.

At block 508, the augmentation component generates multiple second representations of the real-world environment (e.g., transformed environment representations 304), based on the first representation of the real-world environment and the set of user paths. Each second representation of the real-world environment may include a 3D point cloud or a 3D mesh of the available space along a different user path within the real-world environment. In one embodiment, each second representation of the real-world environment may be generated by computing an inverse of the respective path from the environment representation 202.

At block 510, the augmentation component obtains an indication of virtual object(s) (e.g., virtual object(s) 208) available for placing within the real-world environment (e.g., as part of an AR/MR experience). The virtual object(s) may include at least one dynamic (e.g., changing) virtual object, which may be in the form of a 3D mesh.

At block 512, the augmentation component generates, for each second representation of the real-world environment, a set of information (e.g., correspondence information 306) for matching the virtual object(s) to the available space(s) within the second representation of the real-world environment, based on an evaluation of the virtual object(s) and the second representation of the real-world environment with one or more machine learning techniques. In one embodiment, the matching performed in block 512 may include determining and/or adjusting a size and/or orientation of the virtual object(s) for the matched available space within the respective user path of the real-world environment. In one embodiment, the operations in block 512 may be performed by a matching component 320, described in greater detail above with respect to FIG. 3.

At block 514, the augmentation component generates information (e.g., rendering information 212) for rendering the virtual object(s) on a display device (e.g., display device(s) 160) of the reality augmentation device, based on the matching information and a current position of the reality augmentation device. For example, the rendering information may include at least one of (i) the position in screen space in which to render the virtual object(s), (ii) the orientation in which to render the virtual object(s), or (iii) the size of the virtual object(s) in which to render the virtual object(s), so that the virtual object(s) appears on the display device as being placed with the appropriate size, position, and/or orientation in the available space associated with the current user's position of a given user path within the real-world environment.

At block 516, the augmentation component renders the virtual object(s) on the display device of the reality augmentation device according to the rendering information. In embodiments where the display device is part of an external unit (e.g., external unit 190), the augmentation component (at block 516) can render the virtual object(s) on the display device of the external unit.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method comprising:
   obtaining an indication of at least one virtual object available for placing within a real-world environment as part of an augmented reality (AR) simulation or a mixed reality (MR) simulation;
   generating a first representation of the real-world environment, based on a scan of the real-world environment with one or more sensors of a computing device, wherein the first representation includes a first three-dimensional (3D) mesh representing a geometry of the real-world environment;
   generating at least one second representation of the real-world environment by computing an inverse of the first 3D mesh corresponding to the first representation of the real-world environment, wherein the at least one second representation comprises a second 3D mesh of at least one empty space in the real-world environment;
   determining a match between one or more attributes of the at least one virtual object and one or more additional attributes of the at least one empty space within the real-world environment, based at least in part on evaluating the at least one virtual object and the at least one second representation of the real-world environment with one or more machine learning models; and
   rendering the at least one virtual object at a position on a display of the computing device, based on the match, the position on the display being associated with the at least one empty space within the real-world environment.

2. The computer-implemented method of claim 1, wherein determining the match between the one or more attributes of the at least one virtual object and the one or more additional attributes of the at least one empty space within the real-world environment comprises determining a size of the at least one virtual object that will fit within the at least one empty space.

3. The computer-implemented method of claim 2, wherein rendering the at least one virtual object comprises rendering the at least one virtual object on the display of the computing device with the determined size.

4. The computer-implemented method of claim 1, wherein the at least one virtual object is a stationary virtual object.

5. The computer-implemented method of claim 1, wherein the at least one virtual object is a dynamic virtual object.

6. The computer-implemented method of claim 1, wherein generating the first representation of the real-world environment comprises filling in the first mesh within a y-up dimension associated with the real-world environment.

7. A computer-implemented method comprising:
   obtaining an indication of at least one virtual object available for placing within a real-world environment as part of an augmented reality (AR) simulation or a mixed reality (MR) simulation;
   generating a first representation of the real-world environment, based on a scan of the real-world environment with one or more sensors of a computing device, wherein the first representation includes a first three-dimensional (3D) mesh representing a geometry of the real-world environment;
   generating at least one second representation of the real-world environment by computing an inverse of the first 3D mesh corresponding to the first representation of the real-world environment, wherein the at least one second representation comprises a second 3D mesh of at least one empty space in the real-world environment;
   determining a match between the at least one virtual object and the at least one empty space within the real-world environment, based at least in part on evaluating the at least one virtual object and the at least one second representation of the real-world environment with one or more machine learning models;
   rendering the at least one virtual object at a position on a display of the computing device, based on the match, the position on the display being associated with the at least one empty space within the real-world environment; and determining a plurality of paths of the computing device through the real-world environment,
wherein:
the at least one second representation indicates the at least one empty space along a first path of the plurality of paths, or
the at least one virtual object is matched to the at least one empty space along the first path of the plurality of paths.

8. The computer-implemented method of claim 7, wherein the plurality of paths comprises a first set of paths through the real-world environment based on a first height range and a second set of paths through the real-world environment based on a second height range.

9. The computer-implemented method of claim 7, wherein:
the at least one virtual object is matched to the at least one empty space along the first path of the plurality of paths;
rendering the at least one virtual object comprises receiving sensor data indicating a position of the computing device along the first path; and
the position on the display corresponds to the position of the computing device within the at least one empty space along the first path.

10. A computing device comprising:
a display;
one or more sensors;
one or more processors; and
a memory storing instructions, which, when executed on the one or more processors perform an operation comprising:
obtaining an indication of at least one virtual object available for placing within a real-world environment as part of an augmented reality (AR) simulation or a mixed reality (MR) simulation;
generating a first representation of the real-world environment, based on a scan of the real-world environment with one or more sensors of a computing device, wherein the first representation includes a first three-dimensional (3D) mesh representing a geometry of the real-world environment;
generating at least one second representation of the real-world environment by computing an inverse of the first 3D mesh corresponding to the first representation of the real-world environment, wherein the at least one second representation comprises a second 3D mesh of at least one empty space in the real-world environment;
determining a match between one or more attributes of the at least one virtual object and one or more additional attributes of the at least one empty space within the real-world environment, based at least in part on evaluating the at least one virtual object and the at least one second representation of the real-world environment with one or more machine learning models; and
rendering the at least one virtual object at a position on the display, based on the match, the position on the display being associated with the at least one empty space within the real-world environment.

11. The computing device of claim 10, wherein determining the match between the one or more attributes of the at least one virtual object and the one or more additional attributes of the at least one empty space within the real-world environment comprises determining an orientation of the at least one virtual object that will fit within the at least one empty space.

12. The computing device of claim 10, the operation further comprising determining a plurality of paths of the computing device through the real-world environment, wherein the at least one second representation further indicates the at least one empty space along a first path of the plurality of paths.

13. The computing device of claim 12, wherein the plurality of paths comprises a first set of paths through the real-world environment based on a first height range and a second set of paths through the real-world environment based on a second height range.

14. The computing device of claim 10, further comprising determining a plurality of paths of the computing device through the real-world environment, wherein the one or more attributes of the at least one virtual object is matched to the one or more additional attributes of the at least one empty space along a first path of the plurality of paths.

15. The computing device of claim 14, wherein:
rendering the at least one virtual object comprises receiving sensor data indicating a position of the computing device along the first path; and
the position on the display corresponds to the position of the computing device within the at least one empty space along the first path.

16. A non-transitory computer-readable medium containing computer program code that, when executed by operation of one or more computer processors, performs an operation comprising:
obtaining an indication of at least one virtual object available for placing within a real-world environment as part of an augmented reality (AR) simulation or a mixed reality (MR) simulation;
generating a first representation of the real-world environment, based on a scan of the real-world environment with one or more sensors of a computing device, wherein the first representation includes a first three-dimensional (3D) mesh representing a geometry of the real-world environment;
generating at least one second representation of the real-world environment by computing an inverse of the first 3D mesh corresponding to the first representation of the real-world environment, wherein the at least one second representation comprises a second 3D mesh of at least one empty space in the real-world environment;
determining a match between one or more attributes of the at least one virtual object and one or more additional attributes of the at least one empty space within the real-world environment, based at least in part on evaluating the at least one virtual object and the at least one second representation of the real-world environment with one or more machine learning models; and
rendering the at least one virtual object at a position on a display of the computing device, based on the match, the position on the display being associated with the at least one empty space within the real-world environment.

17. The non-transitory computer-readable medium of claim 16, wherein determining the match between the one or more attributes of the at least one virtual object and the one or more additional attributes of the at least one empty space within the real-world environment comprises:
determining a first class of the at least one virtual object that will fit within the at least one empty space;

performing semantic segmentation to identify a second class associated with the at least one empty space; and matching the at least one virtual object to the at least one empty space based on the first class and the second class.

18. The non-transitory computer-readable medium of claim 17, wherein rendering the at least one virtual object comprises adjusting at least one of a size or an orientation of the at least one virtual object based on the at least one empty space.

19. The non-transitory computer-readable medium of claim 16, the operation further comprising determining a plurality of paths of the computing device through the real-world environment, wherein the at least one virtual object is matched to the at least one empty space along a first path of the plurality of paths.

20. A computer-implemented method comprising:

obtaining an indication of at least one virtual object available for placing within a real-world environment as part of an augmented reality (AR) simulation or a mixed reality (MR) simulation;

generating a first representation of the real-world environment, based on a scan of the real-world environment with one or more sensors of a computing device, wherein the first representation includes a first three-dimensional (3D) mesh representing a geometry of the real-world environment;

determining a plurality of paths of the computing device through the real-world environment, wherein each path included in the plurality of paths includes a 3D volume of an amount of space taken by a user through the real-world environment;

generating at least one second representation of the real-world environment by computing an inverse of the first 3D mesh corresponding to the first representation of the real-world environment and the plurality of paths, wherein the at least one second representation indicates at least one available space along a first path of the plurality of paths;

determining a match between the at least one virtual object and the at least one available space within the real-world environment, based at least in part on evaluating the at least one virtual object and the at least one second representation of the real-world environment with one or more machine learning models; and rendering the at least one virtual object at a position on a display of the computing device, based on the match, the position on the display being associated with the at least one available space within the real-world environment.

21. The computer-implemented method of claim 20, wherein the plurality of paths comprises a first set of paths through the real-world environment based on a first height range and a second set of paths through the real-world environment based on a second height range.

22. The computer-implemented method of claim 20, wherein the at least one virtual object is matched to the at least one available space along a second path of the plurality of paths.

* * * * *